United States Patent [19]

Allen

[11] 4,033,144
[45] July 5, 1977

[54] FLEXIBLE COUPLING

[76] Inventor: Clifford H. Allen, 13109 Westchester Trail, Chesterland, Ohio 44026

[22] Filed: Feb. 18, 1976

[21] Appl. No.: 659,129

[52] U.S. Cl. .................................. 64/12; 64/19
[51] Int. Cl.² .................................. F16D 3/62
[58] Field of Search ............... 64/12, 19, 11, 13

[56] References Cited
UNITED STATES PATENTS

| | | |
|---|---|---|
| 2,181,888 | 12/1939 | Gustin ........................... 64/12 |
| 2,864,245 | 12/1958 | Amberg ........................... 64/12 |
| 3,481,158 | 12/1969 | Mayerjak ........................... 64/12 |
| 3,592,021 | 7/1971 | Mayerjak ........................... 64/12 |

*Primary Examiner*—Samuel Scott
*Assistant Examiner*—Randall Heald
*Attorney, Agent, or Firm*—Bosworth, Sessions & McCoy

[57] ABSTRACT

A flexible coupling for connecting a rotary drive to a rotary load where the respective axes are subject to angular or parallel misalignment. An input hub on the drive shaft is connected to an intermediate member through a tripodic connection assembly and the intermediate member is in turn connected to an output hub on the load shaft through another tripodic connection assembly. Each tripodic connection assembly comprises three flexible resilient elements in the form of strips generally arranged to form an equiangular triangle. The strips are each connected by rigid connections to one of the hubs at one of their ends and to the intermediate member at the other of their ends. The respective connections for corresponding ends of the strips are at three symmetrically spaced locations around a circumscribing circle. The strips are adapted to flex intermediate their ends during rotation of the drive and load to accommodate angular misalignment and/or parallel misalignment between the respective axes of the shafts.

10 Claims, 10 Drawing Figures

FLEXIBLE COUPLING

BACKGROUND OF THE INVENTION

This invention relates to flexible couplings for connecting and transmitting torque between two shafts or other rotatable parts and especially to a coupling that can accommodate a certain amount of angular or parallel misalignment, or both, between the shafts. More particularly, the invention relates to a flexible coupling capable of connecting rotary shafts with their respective axes angularly and/or laterally misaligned while maintaining a generally constant velocity relationship.

Flexible couplings for use between shafts that have their axes misaligned either through error or by design are available in the art for many applications; however, these are limited in capability, both as to their durability and the permissable range of angular or parallel misalignment between their axes. Some of these utilize elastomeric material to accommodate misalignment but they are vulnerable to failure due to heat generation. They also lack torsional stiffness and can accommodate only slight angles of axial misalignment such as one or two degrees.

On the other hand conventional flexible couplings which use flexing elements which are non-elastomeric are subject to extremely high stresses and are thus limited to very small amounts of misalignment such as one-half a degree or one degree.

Other non-elastomeric types of flexible couplings such as universal joints and especially universal joints of the Cardan type permit a high degree of shaft misalignment such as at angles of 10° or more; however, they do not provide a constant velocity relationship between the rotating shafts. Some special types of universal joints do provide a constant velocity relationship, however, these are subject to large amounts of bearing wear and must be provided with lubricated bearings and seals.

The flexible coupling of the present invention reduces the difficulties indicated above and affords other features and advantages heretofore not obtainable.

SUMMARY OF THE INVENTION

It is among the objects of the invention to provide a flexible coupling for connecting and transmitting torque between two shafts or other rotatable parts even though the axes of the respective shafts are angularly or laterally misaligned.

Another object of the invention is to connect a rotary drive to a rotary load where the axes of the drive and load are angularly misaligned, while providing a constant velocity relationship between the rotary drive and the rotary load.

Another object of the invention is to provide a non-elastomeric flexible coupling to connect a rotary drive to a rotary load wherein the coupling provides much greater flexibility than is provided by conventional non-elastomeric types of flexible couplings.

Still another object of the invention is to connect a rotary drive to a rotary load wherein the axes of the drive and load may be angularly misaligned to the extent of 10° or more.

These and other objects are accomplished by the unique flexible coupling construction of the invention whereby a rotary drive is connected to a rotary load that probably has its axis misaligned, angularly or laterally or both, relative to the axis of the rotary drive. The coupling includes an input hub on the drive shaft and an output hub on the load shaft. Interposed between the two hubs is an intermediate plate member generally perpendicular to the respective axes and connected on one side to the input hub through one tripodic connection assembly and on the other side to the output hub through another tripodic connection assembly.

Each of the tripodic connection assemblies comprises three flexible flat elements of equal length generally arranged in triangular form and when unflexed, in a common plane generally perpendicular to the respective hub axis. The three flexible elements of each assembly are connected at rigid connections to the intermediate member at one end and to the respective hub at the other end. The three respective connections for corresponding ends are at symmetrically spaced locations around a circumscribing circle.

The flexible elements are adapted to flex intermediate their ends to accommodate angular and parallel misalignment between the respective axes of the hubs preferably to provide a constant velocity relationship between the rotary drive and the rotary load regardless of the angular or parallel misalignment.

DESCRIPTION OF THE PREFERRED EMBODIMENT

Figure 1:
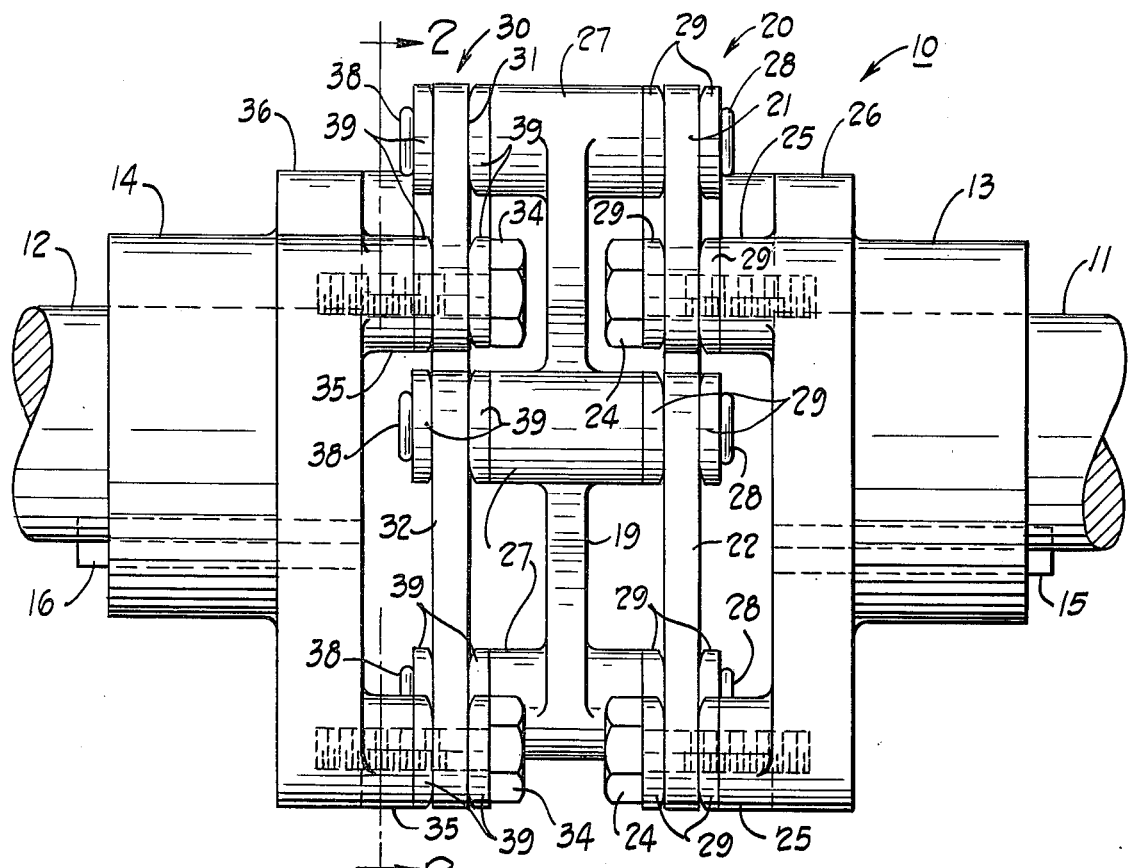
FIG. 1 is an elevational view of a flexible coupling embodying the invention.
Figure 2:
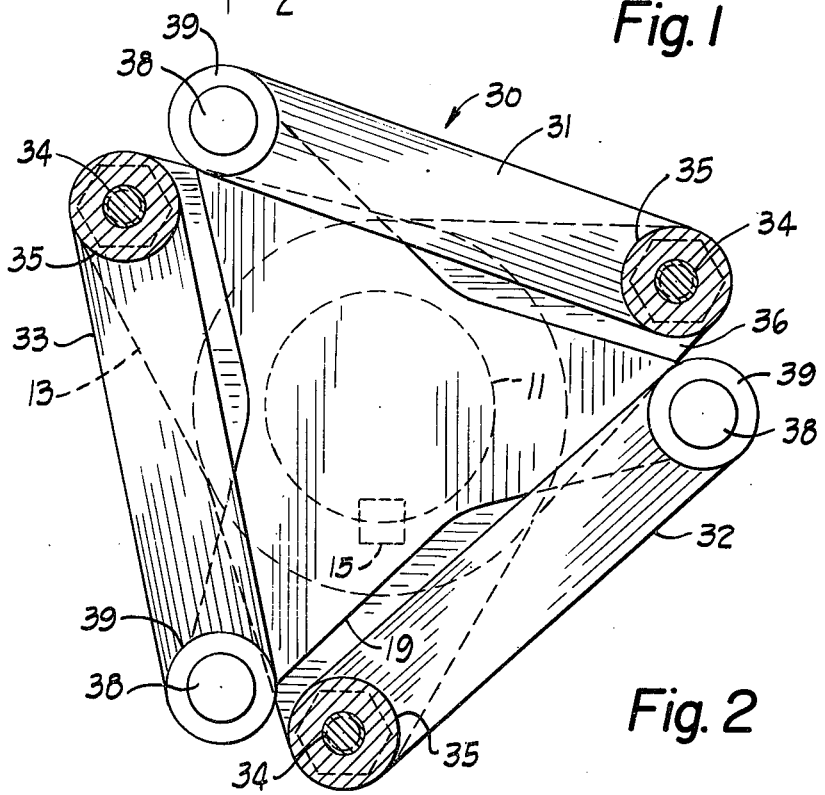
FIG. 2 is a sectional view taken on the line 2—2 of FIG. 1.

Referring more particularly to the drawings and initially to FIGS. 1 to 6, there is shown a flexible coupling 10 for connecting a rotary drive shaft 11 to a rotary load shaft 12. The coupling includes an input hub 13 mounted on the drive shaft 11 and an output hub 14 mounted on the load shaft 12. The hubs 13 and 14 are secured to the shafts 11 and 12 by keys 15 and 16 respectively, seated in slots in the respective hub and shaft. Located between the two hubs 13 and 14 is a flat three-pointed intermediate plate member 19 positioned generally perpendicular to the axes of the shafts 11 and 12.

The input hub 13 is connected to the intermediate plate member 19 by means of a tripodic connection assembly 20 including three flat flexible resilient steel strips 21, 22 and 23 of equal length. The strips 21, 22 and 23 are arranged when unflexed in a common plane generally perpendicular to the hub axis and in a triangular form. The strips 21, 22 and 23 are connected at one end to the input hub 13 by bolts 24 which anchor the respective ends of the strips 21, 22 and 23 to mounting posts 25 formed on a radial three-pointed flange 26 on the input hub 13. The three resulting connection points are located at symmetrically spaced locations around a circumscribing circle to define an equilateral triangle.

The opposite ends of the respective strips 21, 22 and 23 are connected to the intermediate plate member 19 at posts 27 formed on the member 19 and adapted to receive rivets 28. These posts are likewise located at symmetrically spaced locations around a circumscribing circle to define an equilateral triangle concentric with but offset from the triangle defined by the opposite ends of the strips 21, 22 and 23. Both ends of each strip 21, 22 and 23 are held between curved-faced washers 29.

The output hub 14 is connected to the intermediate member 19 by another tripodic connection assembly 30 including three flat flexible steel strips 31, 32 and 33 which are, in all respects, identical to the strips 21, 22 and 23. The strips 31, 32 and 33 are fastened by bolts 34 to posts 35 on a radial three-pointed flange 36 on the output hub 14. The connection points are located at symmetrically spaced locations around a circumscribing circle to define an equilateral triangle concentric with and in the same relative orientation as the triangle defined by the connection points on the input hub 13.

The opposite ends of the strips 31, 32 and 33 are connected to the intermediate member 19 at the opposite sides of posts 25 by the same rivets 28 that connect the strips 21, 22 and 23 to the intermediate plate member 19. Both ends of each strip 31, 32 and 33 are retained between curved-faced washers 39. Accordingly, the connection points for the flexible strips 31, 32 and 33 to the intermediate member 19 correspond exactly to the connection points for the strips 21, 22 and 23.

Figure 3:
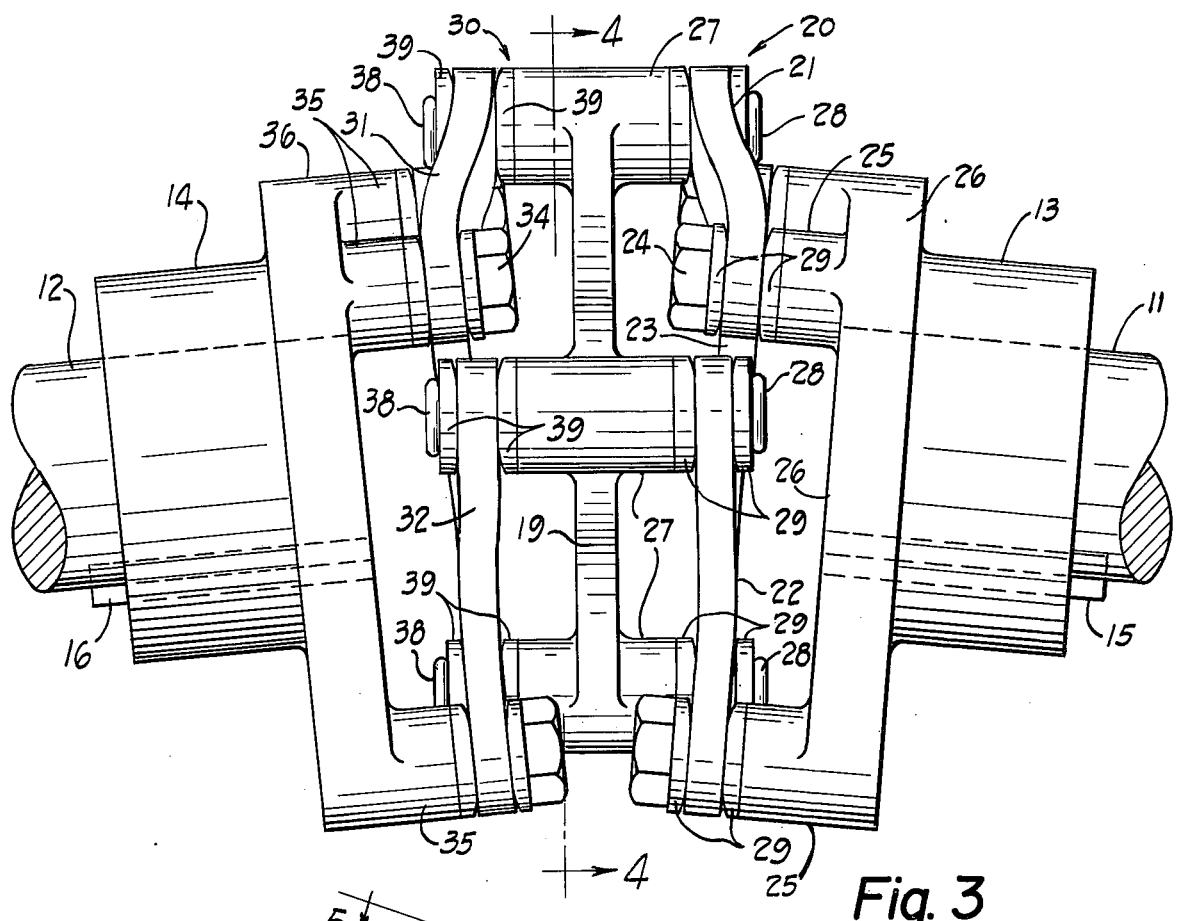
FIG. 3 is an elevational view similar to FIG. 1 showing the flexible coupling of the invention connecting a rotary drive to a rotary load with its axis at an angle of about 8° to the axis of the rotary drive.

FIG. 3 illustrates a typical operating condition for the coupling wherein it will be seen that the shafts 11 and 12 are located with their axes angularly misaligned from one another. The angle defined by the axes for the shafts is about 8° in the typical circumstance shown. This misalignment is accommodated in the coupling by means of the two tripodic connection assemblies 20 and 30, and it will be seen that the respective flexible strips 21, 22 and 23 and 31, 32 and 33 are flexed depending upon their position around the central axis in a manner sufficient to accommodate the angular misalignment and also to transmit torque from one shaft to the other through the coupling. The strips are formed, for example of AISI 1095 steel to provide the desired flexibility as well as adequate tensile strength.

Figure 4:
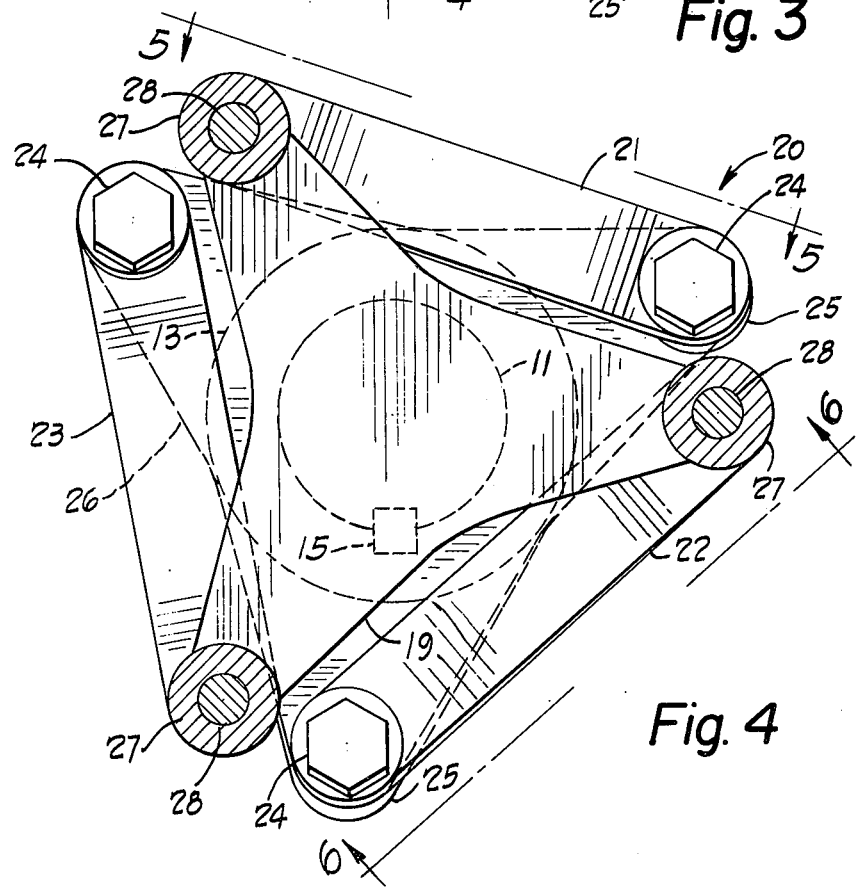
FIG. 4 is a sectional view taken on the line 4—4 of FIG. 3.
Figure 5:
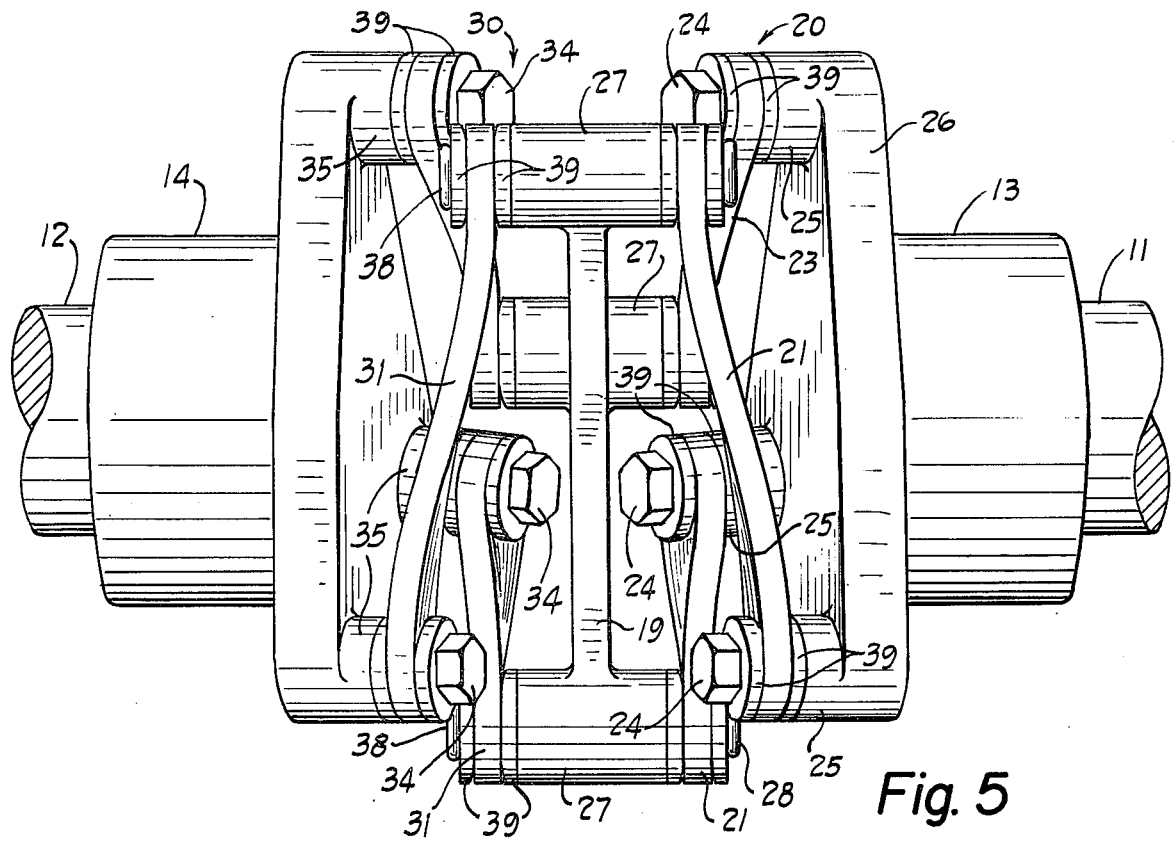
FIG. 5 is an elevational view taken on the line 5—5 of FIG. 4 illustrating the condition of the flexing elements at one location during a 360° rotation of the coupling.
Figure 6:
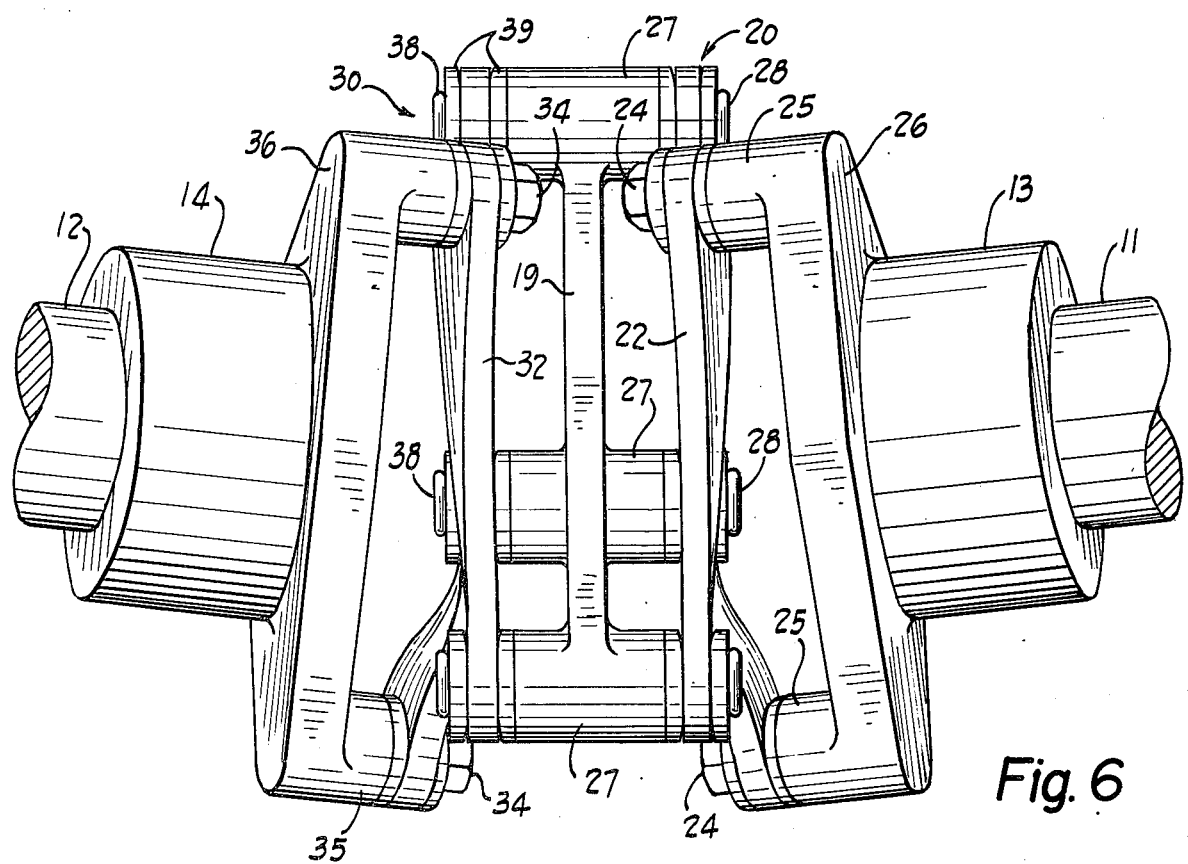
FIG. 6 is an elevational view taken on the line 6—6 of FIG. 4 illustrating the condition of the flexing elements at another point in a 360° rotation of the flexible coupling.

It will be seen that the flexing that occurs during a 360° rotation of the coupling 10 produces a varying condition in each of the flexible strips 21, 22, 23, 31, 32 and 33. Two typical conditions of flexing are illustrated in FIGS. 5 and 6 which show the strips 22 and 32 flexed with their ends in two non-parallel planes. This produces the compound bending shown at the particular location in the 360° rotation illustrated at FIG. 5. The strips 21 and 31 are flexed in a pure bending condition at the particular location illustrated in FIG. 5. FIG. 4 is the better illustration of pure bending. FIG. 6 shows torsional twist as well as bending.

It will be apparent that the flexing of the strips changes their effective length or more particularly changes the distance between the connection points. Accordingly, the effective length of the strips varies in a cyclic manner during each full rotation of the coupling. This cyclic change in the effective length of the strips is completed for each strip in each 360° of coupling rotation and is the same for each strip since all of the strips are equal in shape and length in their assembled geometry relative to the coupling.

Due to the tripodic attachment of the flexing strips these changes in effective length are readily accommodated by small displacements of the intermediate member 19. The intermediate member adjusts itself to any uneven distribution of these three effective lengths by moving into whatever position it is carried by the three connection points much as a surveyor's tripod adjusts itself to the uneven surface of ground on which it is placed.

Obviously, in the case of a tripod, if the ground should shift slightly while the tripod is in contact with the ground on each of its three legs, the tripod will follow this ground shift without losing its basic stability provided, of course, that this ground shift is not excessive enough to cause the tripod to be overbalanced. The tripodic coupling intermediate member accomplishes the same purpose in tangential and radial accommodations to the changes in effective lengths of the three connecting flexing strips.

The importance of this freedom to accommodate changes in effective length of the flexing strips derives from the fact that this action avoids any tendency to interfere with the changes in effective strip length. Thus, no secondary stresses are imposed on these strips such as stretching of the strip which does occur in conventional types of flexible couplings such as flexible disk couplings or other couplings in which more than three connecting link sections are present. The tripodic coupling by avoiding these secondary stresses provides substantially greater flexibility than do conventional couplings which use non-elastomeric flexing elements and does so at lower stress levels so that the endurance life of the coupling is substantially improved.

The 120° angle formed between adjacent strips results in a pattern of instantaneous link length relationship which is repeated for each 120° of rotation of the coupling. In other words, the intermediate member experiences a small-amplitude cyclic eccentric displacement which has a frequency three times the frequency of coupling rotation. However, because the connection points for the strips 21, 22 and 23 to the hub 13 correspond generally (in a geometric sense) to the connection points for the strips 31, 32 and 33 at the output hub 14, the effective length variations compliment one another and accordingly, a constant velocity relationship exists between the drive shaft 11 and the load shaft 12.

FIGS. 7 AND 8

Figure 7:
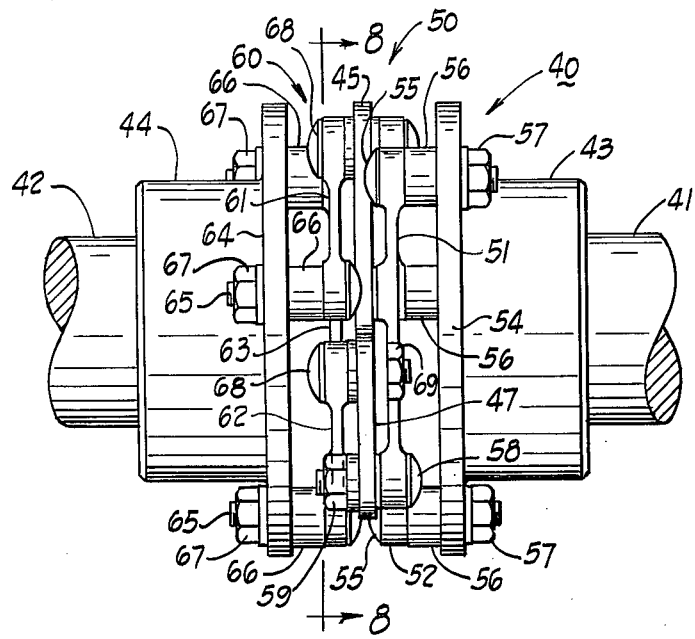
FIG. 7 is an elevational view of an alternate form of flexible coupling embodying the invention.
Figure 8:
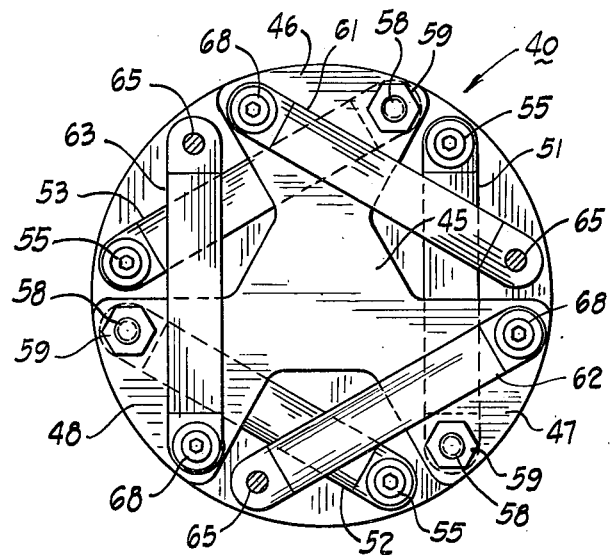
FIG. 8 is a sectional view taken on the line 8—8 of FIG. 7.

FIGS. 7 and 8 illustrate a modified form of coupling embodying the invention and which differs from the coupling of FIGS. 1 to 6 primarily in the location of the connection points for the flexible strips. The coupling 40 of FIGS. 7 and 8 connects a drive shaft 41 to a load shaft 42, the drive shaft having an input hub 43 mounted thereon and the load shaft 42 having an output hub 44. An intermediate member 45 is located between the two hubs and has three radially extending symmetrically spaced arms 46, 47 and 48, each arm providing two circumferentially spaced connection points. The input hub 43 is connected to the intermediate member 45 by a tripodic connection assembly 50 including three flexible strips 51, 52 and 53, while the output hub 54 is connected to the intermediate member 45 by a tripodic connection assembly 60 also including three flexible strips 61, 62 and 63. The strips 51, 52, 53, 61, 62 and 63 are molded from a suitable engineering grade plastic material — for example, an acetal resin such as "DELRIN" or "CELCON" and have enlarged end portions to provide reinforcement at the connection points. The strips 51, 52 and 53 are connected at one end at symmetrically spaced locations to a radial flange 54 on the hub 43 using bolts 55, spacer sleeves 56 and nuts 57.

The opposite ends of the strips 51, 52 and 53 are connected to the arms 46, 47 and 48 of the intermediate member 45 using bolts 58 and nuts 59. One of the strips 51, 52 and 53 is connected to each of the three arms 46, 47 and 48 so that the connection points are at symmetrically spaced locations about a circumscribing circle.

The strips 61, 62 and 63 are connected at one end, at symmetrically spaced locations to a radial flange 64 on the hub 44 using bolts 65, spacer sleeves 66 and nuts 67 to provide connections that are offset approximately 60° from corresponding connection points on the radial flange 54. The opposite ends of each of the strips 61, 62 and 63 are connected to the arms 46, 47 and 48 of the intermediate member 45 at corresponding opposite connection points on the arms from the connection points for the strips 51, 52 and 53. The connections are made using bolts 58 and nuts 59 as best seen in FIG. 7.

It will be noted that none of the connection points correspond to any of the other connection points for either of the tripodic connection assemblies 50 and 60 so that the triangular form defined by the strips 51, 52 and 53 is 60° out of angular orientation relative to the triangular form defined by the strips 61, 62 and 63. This arrangement produces a coupling of narrower axial width since there is no interference between the connections. However, a pure constant velocity relationship between the respective shafts 41 and 42 may not be obtained.

FIGS. 9 AND 10

Figure 9:
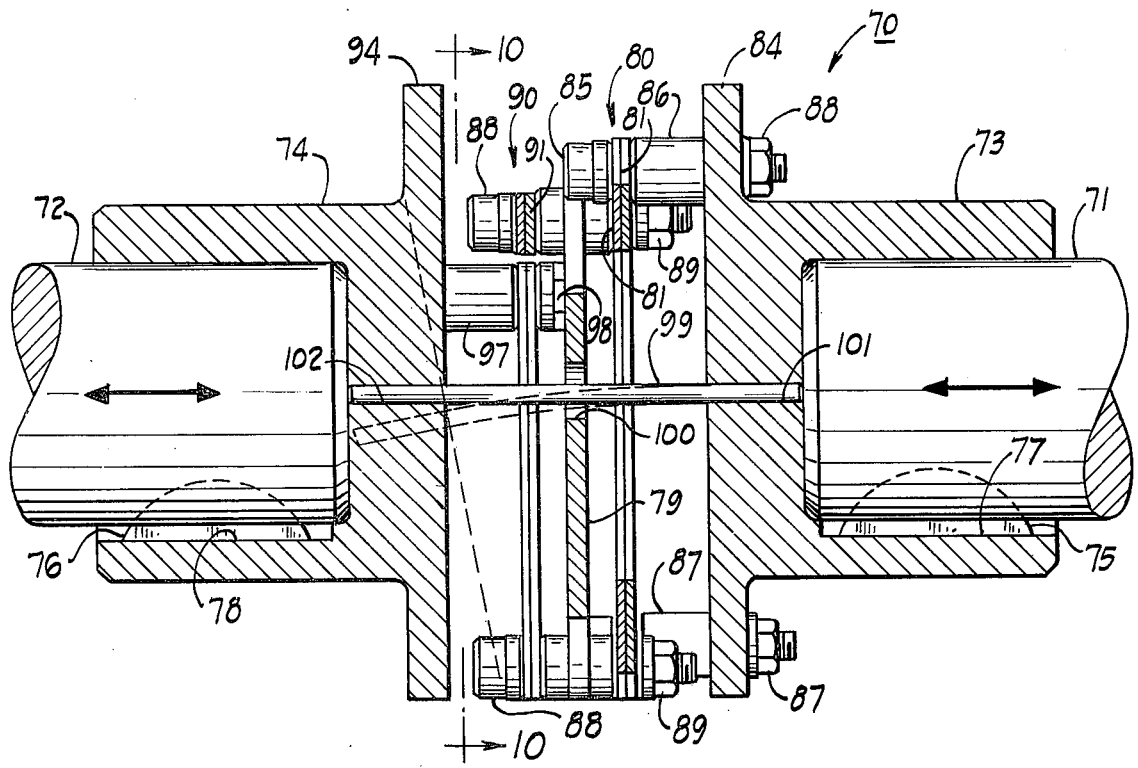
FIG. 9 is a sectional view taken on the line 9—9 of FIG. 10 through a flexible coupling embodying a modified form of the invention.
Figure 10:
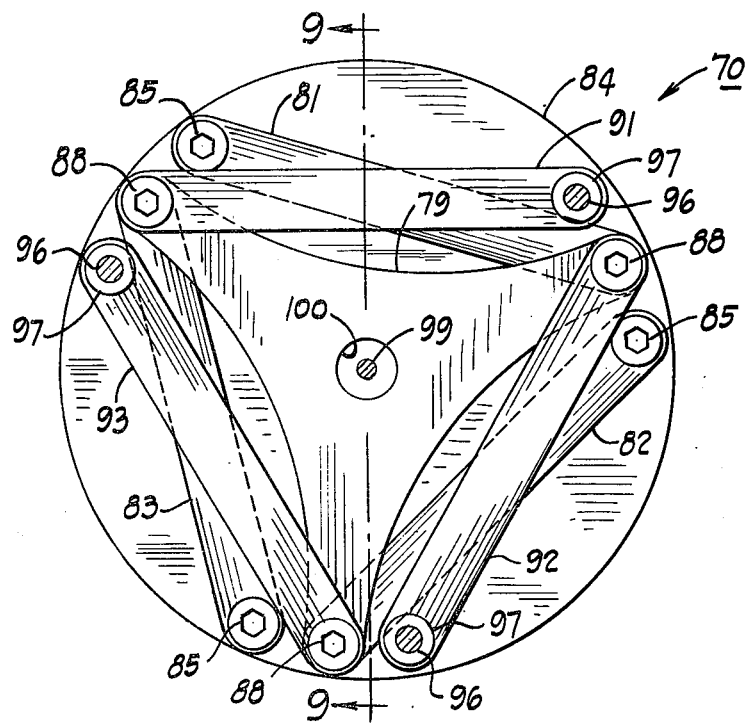
FIG. 10 is a sectional view taken on the line 10—10 of FIG. 9.

FIGS. 9 and 10 illustrate still another modified form of coupling embodying the invention which is particularly useful where any end float between the shafts is to be avoided and wherein certain end loads may be expected. The coupling 70 is adapted to connect a drive shaft 71 to a load shaft 72. The coupling 70 includes an input hub 73 on the drive shaft 71 and an output hub 74 on the load shaft 72. The hubs 73 and 74 are secured to the shafts 71 and 72 by keys 75 and 76 respectively seated in slots 77 and 78 the respective hub and shaft. Located between the two hubs 73 and 74 is a three-pointed intermediate member 79 positioned generally perpendicular to the axes of the shafts 71 and 72.

The input hub 73 is connected to the intermediate member 79 by means of a tripodic connection assembly 80 including three flat flexible resilient steel strips 81, 82 and 83 formed of two superposed laminations to provide certain desirable flexing characteristics. The laminations are formed, for example of AISI 1065 steel.

The strips 81, 82 and 83 are arranged in a triangular form and (when unflexed) in a common plane generally perpendicular to the hub axis. The strips 81, 82 and 83 are connected at one end to a radial flange 84 on the input hub 73 by bolts 85, spacer sleeves 86 and nuts 87. The opposite ends of the strips 81, 82 and 83 are connected to the intermediate member 79 by bolts 88 and nuts 89. The resulting connection pattern is best illustrated in FIG. 10.

The output hub 74 is connected to the intermediate member 79 by another tripodic connection asembly 90 including three flat flexible steel strips 91, 92 and 93 that are, identical to the strips 81, 82 and 83. The strips 91, 92 and 93 are fastened to a radial flange 94 on the hub 74 by bolts 96, spacer sleeve 97 and nuts 98, at three connections located at symmetrically spaced locations around a circumscribing circle.

The opposite ends of the strips 91, 92 and 93 are connected to the intermediate member 79 by the bolts 88 and nuts 89. The resulting connection is best illustrated in FIG. 10. It will be noted that the two resulting triangles defined by the strips 81, 82, 83, 91, 92 and 93 are offset somewhat from one another.

The embodiment of FIGS. 9 and 10 also has a flexible end load transmitting quill 99 located between the two shafts 71 and 72. The quill 99 is press fitted, bonded or otherwise secured at each end in the openings 101 and 102 in the respective hubs 73 and 74 and bears against the ends of the respective shafts 71 and 72. Also, the quill extends through a central opening 100 in the intermediate member 79. When the shafts are angularly misaligned, the quill 99 will flex as illustrated in dashed lines in FIG. 9, however, any end load experienced during operation of the coupling will be transmitted from one shaft to the other in the directions indicated by the arrows in FIG. 9.

While the invention has been shown and described with respect to a specific embodiment thereof this is intended for the purpose of illustration rather than limitation and other variations and modifications of the specific device herein shown and described will be apparent to those skilled in the art all within the intended spirit and scope of the invention. Accordingly, the patent is not to be limited in scope and effect of the specific device herein shown and described nor in any other way that is inconsistent with the extent to which the progress in the art has been advanced by the invention.

I claim:

1. A flexible coupling for connecting a rotary drive to a rotary load and for accommodating axial misalignment between said drive and load comprising:
    an input hub on said rotary drive,
    an output hub on said rotary load,
    an intermediate member located between said hubs,
    a tripodic connection assembly between said input hub and said intermediate member, and
    a tripodic connection assembly between said intermediate member and said output hub,
    said tripodic connection assemblies each comprising three linking elements generally arranged in triangular form in a plane perpendicular to the respective hub axis and connected at rigid connections to said intermediate member at one end and to the respective hub at the other end, said connections for corresponding ends being at symmetrically spaced locations around a circumscribing circle, said linking elements being adapted to flex intermediate their ends to accommodate misalignment between the respective axes of said hubs, the flexing stresses consisting essentially of bending and torsion.

2. A coupling as defined in claim 1 wherein said linking elements are formed of metal.

3. A coupling as defined in claim 2 wherein said metal is steel.

4. A coupling as defined in claim 1 wherein said elements are formed of an engineering grade plastic material.

5. A coupling as defined in claim 4 wherein said engineering grade plastic material is "DELRIN."

6. A coupling as defined in claim 4 wherein said engineering grade plastic material is "CELCON."

7. A coupling as defined in claim 1 wherein said intermediate member is adapted to accommodate small changes in effective lengths of said elements without interfering with the flexing of said elements.

8. A flexible coupling as defined in claim 1 wherein said rigid connections between said intermediate member and said linking elements of both tripodic connection assemblies are at aligned corresponding locations on opposite sides of said intermediate member.

9. A flexible coupling as defined in claim 1 wherein said rigid connections between said intermediate member and one of said tripodic connection assemblies are off-set from said rigid connections between said intermediate member and the other of said tripodic connection assembies.

10. A flexible coupling as defined in claim 1 wherein said intermediate member is provided with a central opening and including a flexible end-load-transmitting element extending axially through said opening and bearing against said rotary drive and said rotary load whereby when said drive and said load are angularly misaligned, said element will flex to accommodate said misalignment while still transmitting any axial loads between said rotary drive and said rotary load.

* * * * *